US007314674B2

(12) United States Patent
Hazel et al.

(10) Patent No.: US 7,314,674 B2
(45) Date of Patent: Jan. 1, 2008

(54) CORROSION RESISTANT COATING COMPOSITION, COATED TURBINE COMPONENT AND METHOD FOR COATING SAME

(75) Inventors: Brian Thomas Hazel, West Chester, OH (US); Michael James Weimer, Loveland, OH (US)

(73) Assignee: General Electric Company, Schnectady, NY (US)

( * ) Notice: Subject to any disclaimer, the term of this patent is extended or adjusted under 35 U.S.C. 154(b) by 263 days.

(21) Appl. No.: 11/011,695

(22) Filed: Dec. 15, 2004

(65) Prior Publication Data

US 2006/0127694 A1 Jun. 15, 2006

(51) Int. Cl.
*B32B 15/04* (2006.01)
*F03B 3/12* (2006.01)

(52) U.S. Cl. ...................... 428/701; 428/632; 428/702; 428/469; 416/241 B; 416/241 R

(58) Field of Classification Search ................ 428/701, 428/702, 469, 632; 416/241 B, 241 R
See application file for complete search history.

(56) References Cited

U.S. PATENT DOCUMENTS 3,248,249 A 4/1966 Collins, Jr.
3,248,250 A 4/1966 Collins, Jr.
3,248,251 A 4/1966 Allen
3,460,955 A * 8/1969 Airola ........................ 106/623
3,741,791 A * 6/1973 Maxwell ..................... 427/250
3,748,172 A * 7/1973 Speirs ........................ 428/658
4,353,780 A 10/1982 Fishter et al.
4,411,730 A 10/1983 Fishter et al.
4,537,632 A 8/1985 Mosser
4,544,408 A 10/1985 Mosser et al.
4,563,239 A 1/1986 Adinolfi et al.
4,564,555 A 1/1986 Hornberger
4,606,967 A 8/1986 Mosser
4,617,056 A 10/1986 Mosser et al.
4,659,613 A 4/1987 Mosser et al.
4,724,172 A 2/1988 Mosser et al.
4,806,161 A 2/1989 Fabiny et al.
4,863,516 A 9/1989 Mosser et al.
4,889,558 A 12/1989 Mosser
4,917,960 A 4/1990 Hornberger et al.
4,975,330 A 12/1990 Mosser
5,066,540 A 11/1991 Mosser et al.
5,368,888 A 11/1994 Rigney (Continued)

*Primary Examiner*—Jennifer C. McNeil
(74) *Attorney, Agent, or Firm*—Michael R. Louke; William Scott Andes

(57) ABSTRACT

A composition comprising a particulate corrosion resistant component, and a glass-forming binder component. The particulate corrosion resistant component comprises from 0 to about 95% alumina particulates, and from about 5 to 100% corrosion resistant non-alumina particulates having a CTE greater than that of the alumina particulates. Also disclosed is an article comprising a turbine component comprising a metal substrate and a corrosion resistant coating having thickness up to about 10 mils (254 microns) overlaying the metal substrate. At least the layer of this coating adjacent to the metal substrate comprises a glass-forming binder component and the particulate corrosion resistant component adhered to the glass-forming binder component. Further disclosed is a method comprising the following steps: (a) providing a turbine component comprising the metal substrate; (b) depositing on the metal substrate a corrosion resistant coating composition; and (c) curing the deposited corrosion resistant coating composition to form at least one layer of a corrosion resistant coating having a thickness up to about 10 mils (254 microns).

25 Claims, 5 Drawing Sheets

U.S. PATENT DOCUMENTS

| | | | | |
|---|---|---|---|---|
| 5,472,783 | A | 12/1995 | Mosser et al. | |
| 5,723,078 | A | 3/1998 | Nagaraj et al. | |
| 5,985,454 | A | 11/1999 | McMordie et al. | |
| 6,071,622 | A * | 6/2000 | Beesabathina et al. | 428/427 |
| 6,074,464 | A | 6/2000 | Eddinger et al. | |
| 6,197,424 | B1 * | 3/2001 | Morrison et al. | 428/402 |
| 6,224,657 | B1 | 5/2001 | Myers et al. | |
| 6,283,715 | B1 | 9/2001 | Nagaraj et al. | |
| 6,368,394 | B1 | 4/2002 | Hughes et al. | |
| 6,440,499 | B1 * | 8/2002 | Wydra et al. | 427/376.8 |
| 6,465,090 | B1 * | 10/2002 | Stowell et al. | 428/325 |
| 6,544,351 | B2 | 4/2003 | Wang et al. | |
| 2004/0013802 | A1 | 1/2004 | Ackerman et al. | |
| 2005/0013994 | A1 * | 1/2005 | Strangman | 428/336 |

* cited by examiner

CORROSION RESISTANT COATING COMPOSITION, COATED TURBINE COMPONENT AND METHOD FOR COATING SAME

BACKGROUND OF THE INVENTION

This invention broadly relates to a corrosion resistant coating composition comprising a particulate corrosion resistant component, and a glass-forming binder component. This invention also broadly relates to an article comprising a turbine component coated with at least one layer of this composition. This invention further broadly relates to a method for coating the article with at least one layer of this composition.

In an aircraft gas turbine engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against the airfoil section of the turbine blades, which turns the shaft and provides power to the compressor. The hot exhaust gases flow from the back of the engine, driving it and the aircraft forward. The hotter the combustion and exhaust gases, the more efficient is the operation of the jet engine. Thus, there is incentive to raise the combustion gas temperature.

The compressors and turbine of the turbine engine can comprise turbine disks (sometimes termed "turbine rotors") or turbine shafts, as well as a number of blades mounted to the turbine disks/shafts and extending radially outwardly therefrom into the gas flow path, and rotating. Also included in the turbine engine are rotating, as well as static, seal elements that channel the airflow used for cooling certain components such as turbine blades and vanes. As the maximum operating temperature of the turbine engine increases, the turbine disks/shafts and seal elements are subjected to higher temperatures. As a result, oxidation and corrosion of the disks/shafts and seal elements have become of greater concern.

Metal salts such as alkaline sulfate, sulfites, chlorides, carbonates, oxides, and other corrodant salt deposits resulting from ingested dirt, fly ash, concrete dust, sand, sea salt, etc. are a major source of the corrosion, but other elements in the bleed gas environment can also accelerate the corrosion. Alkaline sulfate corrosion in the temperature range and atmospheric region of interest results in pitting of the turbine disk/shaft and seal element substrate at temperatures typically starting around 1200° F. (649° C.). This pitting corrosion has been shown to occur on critical turbine disk/shaft and seal elements. The oxidation and corrosion damage can lead to premature removal and replacement of the disks and seal elements unless the damage is reduced or repaired.

Turbine disks/shafts and seal elements for use at the highest operating temperatures are typically made of nickel-base superalloys selected for good elevated temperature toughness and fatigue resistance. These superalloys have resistance to oxidation and corrosion damage, but that resistance is not sufficient to protect them at sustained operating temperatures now being reached in gas turbine engines. Disks and other rotor components made from newer generation alloys can also contain lower levels of chromium, and can therefore be more susceptible to corrosion attack.

Corrosion resistant coating compositions have been suggested for use with various gas turbine components. These include aqueous corrosion resistant coating compositions comprising phosphate/chromate binder systems and aluminum/alumina particles. See, for example, U.S. Pat. No. 4,606,967 (Mosser), issued Aug. 19, 1986 (spheroidal aluminum particles); and U.S. Pat. No. 4,544,408 (Mosser et al), issued Oct. 1, 1985 (dispersible hydrated alumina particles). Corrosion resistant diffusion coatings can also be formed from aluminum or chromium, or from the respective oxides (i.e., alumina or chromia). See, for example, commonly assigned U.S. Pat. No. 5,368,888 (Rigney), issued Nov. 29, 1994 (aluminide diffusion coating); and commonly assigned U.S. Pat. No. 6,283,715 (Nagaraj et al), issued Sept. 4, 2001 (chromium diffusion coating). A number of corrosion-resistant coatings have also been specifically considered for use on turbine disk/shaft and seal elements. See, for example, U.S. Patent Application 2004/0013802 A1 (Ackerman et al), published Jan. 22, 2004 (metal-organic chemical vapor deposition of aluminum, silicon, tantalum, titanium or chromium oxide on turbine disks and seal elements to provide a protective coating). These prior corrosion resistant coatings can have a number of disadvantages, including: (1) possibly adversely affecting the fatigue life of the turbine disks/shafts and seal elements, especially when these prior coatings diffuse into the underlying metal substrate; (2) potential coefficient of thermal expansion (CTE) mismatches between the coating and the underlying metal substrate that can make the coating more prone to spalling; and (3) more complicated and expensive processes (e.g., chemical vapor deposition) for applying the corrosion resistant coating to the metal substrate.

Accordingly, there is still a need for coatings and coating compositions for turbine disk, turbine seal elements and other turbine components that: (1) provide corrosion resistance, especially at higher or elevated temperatures; (2) without affecting other mechanical properties of the underlying metal substrate or potentially causing other undesired effects such as spalling; and (3) can be formed by relatively uncomplicated and inexpensive methods.

BRIEF DESCRIPTION OF THE INVENTION

An embodiment of this invention broadly relates to a composition comprising:

a particulate corrosion resistant component comprising:
- from 0 to about 95% alumina particulates; and
- from about 5 to 100% corrosion resistant non-alumina particulates having a CTE greater than that of the alumina particulates; and a glass-forming binder component.

Another embodiment of this invention broadly relates to an article comprising:

a turbine component comprising a metal substrate; and a corrosion resistant coating having a thickness up to about 10 mils (254 microns) and overlaying the metal substrate, wherein at least the layer of the corrosion resistant coating adjacent to the metal substrate comprises:
- a glass-forming binder component; and
- a particulate corrosion resistant component adhered to the glass-forming binder component and comprising:
  - from 0 to about 95% alumina particulates; and
  - from about 5 to 100% corrosion resistant non-alumina particulates having a CTE greater than that of the alumina particulates.

Another embodiment of this invention broadly relates to a method comprising the following steps:

(a) providing a turbine component comprising a metal substrate;

(b) depositing on the metal substrate a corrosion resistant coating composition; and (c) curing the deposited corrosion resistant coating composition to form at least one layer of a corrosion resistant coating having a thickness up to about 10 mils (254 microns), wherein the corrosion resistant coating composition comprises:

a corrosion resistant particulate component comprising:

from 0 to about 95% alumina particulates; and from about 5 to 100% corrosion resistant non-alumina particulates having a CTE greater than that of the alumina particulates; and a glass-forming binder component.

The composition, article and method of this invention provides a number of significant benefits and advantages in providing corrosion resistant coatings on metal substrates for turbine components. The composition and method of this invention can form a corrosion resistant coating on the turbine component without affecting other mechanical properties of the underlying metal substrate. For example, the corrosion resistant coating composition of this invention provides a better CTE match with the metal substrate of the turbine component, thus making the coating more resistant to spalling during thermal and mechanical cycling at elevated temperatures. The method of this invention for depositing the coating composition on the metal substrate and curing the deposited coating composition can be carried out by relatively uncomplicated and inexpensive techniques.

DETAILED DESCRIPTION OF THE INVENTION

Figure 1:
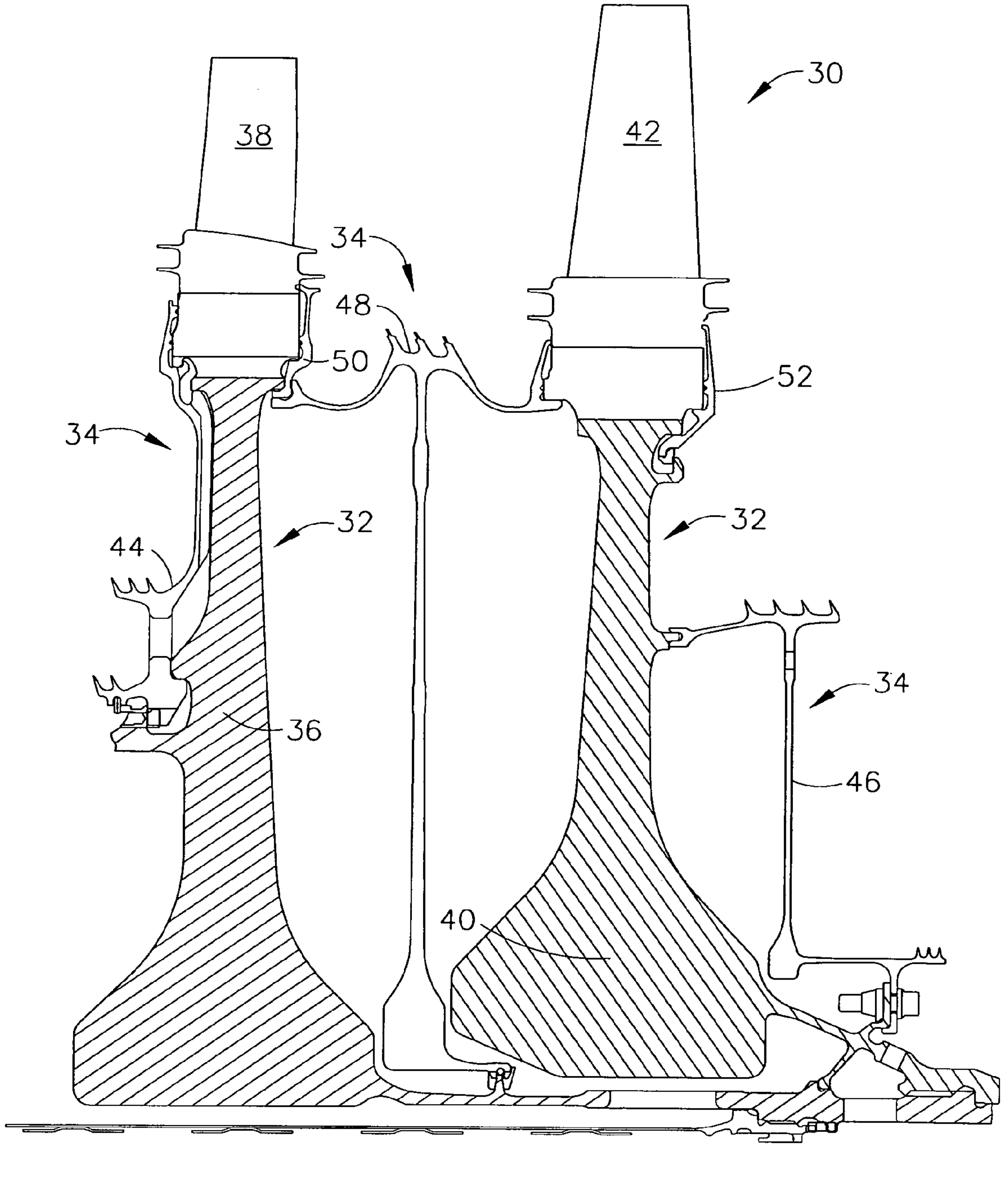
FIG. 1 is a schematic view of a portion of the turbine section of a gas turbine engine.

As used herein, the term "particulate" refers to a particle, powder, flake, etc., that inherently exists in a relatively small form (e.g., a size of about 50 microns or less) or can be formed by, for example, grinding, shredding, fragmenting, pulverizing or otherwise subdividing a larger form of the material into a relatively small form.

As used herein, the term "unimodal particle size distribution" refers to a particle size distribution comprising one particle size fraction. When graphically plotted, a unimodal particle size distribution has essentially a single peak.

As used herein, the term "bimodal particle size distribution" refers to a particle size distribution that comprises a smaller particle size fraction and a larger particle size fraction. When graphically plotted, a bimodal particle size distribution has essentially two distinct peaks.

As used herein, the term "polymodal particle size distribution" refers to a particle size distribution that comprises three or more particle size fractions. When graphically plotted, a polymodal particle size distribution has three or more distinct peaks.

As used herein, the term "alumina particulates" refers to particulates comprising compounds, compositions, etc., of aluminum oxide typically having the formula $Al_2O_3$, including unhydrated and hydrated forms.

As used herein, the term "corrosion resistant non-alumina particulates" refers to particulates that provide corrosion resistance and comprise a metal (other than solely aluminum), a ceramic or combination thereof that is substantially free of alumina.

As used herein, the term "substantially free" means the indicated compound, material, component, etc., is minimally present or not present at all, e.g., at a level of about 0.5% or less, more typically at a level of about 0.1% or less, unless otherwise specified.

As used herein, the term "corrosion resistant particulate component" refers to a component comprising corrosion resistant non-alumina particulates, with or without alumina particulates. The particular level and amount of corrosion resistant non-alumina particulates and alumina particulates present in the corrosion resistant particulate component can be varied depending on the CTE properties desired for the resultant corrosion resistant coating, whether the corrosion resistant coating comprises a single layer or a plurality of layers, the thickness of the coating, the particle size distribution of the corrosion resistant non-alumina particulates and the alumina particulates, etc. The corrosion resistant particulate component comprises from 0 to about 95% alumina particulates and from about 5 to 100% corrosion resistant non-alumina particulates, typically from 0 to about 75% alumina particulates and from about 25 to 100% corrosion resistant non-alumina particulates, more typically from 0 to about 50% alumina particulates and from about 50 to 100% corrosion resistant non-alumina particulates, and can consist essentially of corrosion resistant non-alumina particulates, e.g., 100% corrosion resistant non-alumina particulates. The particulates comprising the corrosion resistant particulate component can have particle sizes in the range of from about 0.01 to about 50 microns, more typically in the range of from about 0.1 to about 25 microns and can comprise particulates having unimodal, bimodal or polymodal particle size distributions. When the corrosion resistant particulate component comprises corrosion resistant non-alumina particulates and alumina particulates, a bimodal particle size distribution can be desirable to provide a greater solids packing density for the particulate component. For bimodal particle size distributions, the larger particle size fraction can comprise the non-alumina particulates, while the smaller particulate size fraction can comprise the alumina particulates, and vice versa.

As used herein, the term "metal" can refer to a single metal or a metal alloy, i.e., a blend of at least two metals (e.g., aluminum alloys). Metals can include chromium, zirconium, nickel, cobalt, iron, titanium, yttrium, magnesium, platinum group metals (e.g., platinum, palladium, rhodium, iridium, etc.), hafnium, silicon, tantalum, etc., alloys of any of these metals, and alloys of any of these metals with aluminum, e.g., overlay metal alloys.

As used herein, the term "ceramic" refers to an oxide, carbide, nitride, etc., of a metal. Ceramics suitable for use herein include oxides carbides, nitrides, etc., of any of the metals (other than solely aluminum) referred to herein, combinations of such oxides, carbide, nitride, etc., including, but not limited to zirconia and phase-stabilized zirconias (i.e., various metal oxides, for example, yttrium oxides blended with zirconia), such as yttria-stabilized zirconias, ceria-stabilized zirconias, calcia-stabilized zirconias, scandia-stabilized zirconias, magnesia-stabilized zirconias, ytterbia-stabilized zirconias, etc., as well as mixtures of such stabilized zirconias. See, for example, Kirk-Othmer's Encyclopedia of Chemical Technology, 3rd Ed., Vol. 24, pp. 882-883 (1984) for a description of suitable zirconias. Suitable yttria-stabilized zirconias can comprise from about 1 to about 65% yttria (based on the combined weight of yttria and zirconia), and more typically from about 3 to about 10% yttria. Other suitable ceramics for use herein include titania, ceria, $Y_3Al_5O_{12}$, lanthanum hexaluminate, and other metal aluminates, chromium carbide ($Cr_2C_3$), etc.

As used herein, the term "overlay metal alloy" refers to metal alloys having the formula MCr, MAl, MCrAl, MCrAlX, or MAlX, wherein M is nickel, cobalt, iron, etc., or an alloy thereof and wherein X is hafnium, zirconium, yttrium, tantalum, platinum, palladium, rhenium, silicon, etc., or a combination thereof. Typically, the overlay metal alloys used herein are MCrAlY alloys, and more typically wherein M is nickel or a nickel-cobalt alloy and wherein X is yttrium (i.e., Y).

As used herein, the term "corrosion resistant coating" refers to coatings that, after curing of the deposited corrosion resistant coating composition of this invention, comprise at least one layer adjacent to the metal substrate having an amorphous, glassy matrix and having embedded therein, encapsulated therein, enclosed thereby, or otherwise adhered thereto, particulates from the corrosion resistant particulate component. Corrosion resistant coatings of this invention can provide resistance against corrosion caused by various corrodants, including metal (e.g., alkaline) sulfates, sulfites, chlorides, carbonates, oxides, and other corrodant salt deposits resulting from ingested dirt, fly ash, concrete dust, sand, sea salt, etc., at temperatures typically of at least about 1000° F. (538° C.), more typically at least about 1200° F. (649° C.), and typically in the range of from about 1000° to about 1600° F. (from about 538° to about 871° C.). The corrosion resistant coatings of this invention can be homogeneous or substantially homogeneous throughout in the terms of the composition of the particulate and binder components, or can comprise a discrete layer(s) adjacent to the metal substrate that comprises a homogenous or substantially homogeneous composition of the particulate and binder components. For example, the corrosion resistant coatings of this invention can be a single layer comprising non-alumina particulates throughout that have a CTE greater than that of alumina, or can be a plurality of layers of differing composition, e.g., an inner layer adjacent to the metal substrate that comprises non-alumina particulates having a CTE greater than that of alumina, an intermediate layer that comprises a higher level of alumina particulates, e.g., a level of alumina particulates such that the CTE is not measurably different from that of alumina, and an outer layer that consists essentially of a composition that is similar to a glass-forming binder component but without particulates, e.g., a sealant composition that forms a glassy top coat.

A used herein, the term "glass-forming binder component" refers to a component comprising a typically inorganic compound, composition, etc., that, when cured, forms an amorphous, glassy matrix to which the particulates in the particulate component are embedded in, are encapsulated in, are enclosed by, or otherwise adhered to. Binder components suitable for use herein typically comprise a phosphate binder, with or without other binder materials. These phosphate binders can be in the form of phosphoric acid or more typically the respective phosphate compounds/compositions, including orthophosphates, pyrophosphates, etc. These phosphate compounds/compositions can be monobasic, dibasic, tribasic or any combination thereof. Phosphate-containing binder components can comprise one or more metal phosphates, including aluminum phosphates, magnesium phosphates, chromium phosphates, zinc phosphates, iron phosphates, lithium phosphates, calcium phosphates, etc, or any combination thereof. Typically, the phosphate-containing binder component comprises an aluminum phosphate, a magnesium phosphate, a chromium phosphate, or a combination thereof. The phosphate-containing binder component can optionally comprise other binder materials, including one or more chromates, molybdates, etc. See, for example, U.S. Pat. No. 3,248,249 (Collins, Jr.), issued Apr. 26, 1966; U.S. Pat. No. 3,248,251 (Allen), issued Apr. 26, 1966; U.S. Pat. No. 4,889,858 (Mosser), issued Dec. 26, 1989; U.S. Pat. No. 4,975,330 (Mosser), issued Dec. 4, 1990, the relevant portions of which are incorporated by reference. The phosphate-containing binder component can also be substantially free of other binder materials, e.g., a substantially chromate free phosphate-containing binder component. See, for example, U.S. Pat. No. 6,368,394 (Hughes et al), issued Apr. 9, 2002 (substantially chromate free phosphate binder component), the relevant portion of which is incorporated by reference.

As used herein, the term "liquid carrier component" refers to any carrier component that is liquid at ambient temperatures and in which the corrosion resistant particulate component and glass-forming binder component is typically carried in, dispersed in, dissolved in, etc. Liquid carrier components include aqueous systems (e.g., comprising water), organic systems (e.g., comprising alcohols such as ethanol, propanol, isopropanol; etc., other liquid organic materials or solvents such as ethylene glycol, acetone, etc.) or any combination thereof. These liquid carrier components can comprise other optional materials such as surfactants, buffers, etc. Aqueous carrier components can consist essentially of water, i.e., is substantially free of other optional materials, but more typically comprises other optional materials such as compatible organic solvents, surfactants, etc. Suitable surfactants for use in aqueous carrier components can include nonionic surfactants, anionic surfactants, cationic surfactants, amphoteric surfactants, zwitterionic surfactants, or any combination thereof. Illustrative examples of surfactants suitable for use herein include ethoxylated alkyl phenols or aliphatic alcohols such as those sold under various trade names or trademarks including Igepal, Levelene, Neutronyx, Surfonic and Triton, nonionic tertiary glycols such as Surfynol 104, cationic secondary and tertiary amines of the polyoxy cocamine type exemplified by Armak Ethomeen C/20 and Emery 6601, quaternary amines such as Armak Ethoquad R/13-50, as well as sodium heptadecyl sulfate, sodium tetradecyl sulfate and sodium 2-ethylhexyl sulfate. The inclusion of surfactants can be for the purpose of improving the wettability of the particulate component, reducing the surface tension of the corrosion resistant coating composition, promoting the formation of improved smoothness in the resultant corrosion resistant coating, etc.

As used herein, the term "corrosion resistant coating composition" refers to any coating composition of this invention comprising the corrosion resistant particulate component, the glass-forming binder component, optionally a liquid carrier component, etc., and which is used to form at least one layer of the corrosion resistant coating of this invention that is adjacent to the metal substrate. For corrosion resistant coating compositions of this invention, the ratio of the corrosion resistant particulate component to glass-forming binder component is typically in the range from about 0.1 to about 10, more typically in the range of from about 0.5 to about 5. The optional liquid carrier component, when included, typically comprises the balance of the corrosion resistant coating composition of this invention. The corrosion resistant coating compositions of this invention can formulated as flowable solids (e.g., flowable powders), can be formulated as cast tapes comprising a blend, mixture or other combination of the particulate and binder components, with or without a supporting structure such as a film, strip, etc., or can be formulated as liquids. The corrosion resistant coating compositions of this invention can comprise other optional components such as colorants or pigments, viscosity modifying or controlling agents, etc. Typically, the corrosion resistant coating compositions of this invention are formulated as liquid compositions. The liquid corrosion resistant coating compositions of this invention can be of any desired consistency, flowability, viscosity, etc., including thixotropic or non-thixotropic compositions. The aqueous corrosion resistant coating compositions of this invention usually have an acidic pH (i.e., below about 7). For example, for aqueous corrosion resistant coating compositions comprising a phosphate-containing binder component, the pH is typically in the range of from about 0 to about 3, and more typically in the range of from about 1.5 to about 3.

As used herein, the term "curing" refers to any treatment condition or combination of treatment conditions that causes the corrosion resistant coating composition to thereby form the corrosion resistant coating. Typically, curing occurs by heating the corrosion resistant coating composition at a temperature of at least about 250° F. (121° C.), more typically at a temperature of at least about 500° F. (260° C.).

As used herein, the term "turbine component" refers to any turbine component that comprises a metal substrate (i.e., the substrate is formed from metals or metal alloys), and includes turbine components comprising airfoils (e.g., blades, vanes, etc.), turbine disks (also referred to sometimes as "turbine rotors"), turbine shafts, turbine seal elements that are either rotating or static, including forward, interstage and aft turbine seals, turbine blade retainers, other static turbine components, etc. The turbine component for which the corrosion resistant coatings of this invention are particularly advantageous are those that experience a service operating temperature of at least about 1000° F. (538° C.), more typically at least about 1200° F. (649° C.), and typically in the range of from about 1000° to about 1600° F. (from about 538° to about 871° C.). These components are usually exposed to compressor bleed air or gas path environments having ingested corrosive components, typically metal sulfates, sulfites, chlorides, carbonates, etc., that can deposit on the surface of the component. The corrosion resistant coatings of this invention are particularly useful when formed on all or selected portions of the surfaces of the component, such as the surfaces of turbine disks/shafts and turbine seal elements. For example, the mid-to-outer portion of the hub of a turbine disk (e.g., perimeter) can have the corrosion resistant coating of this invention, while the bore region, inner portion of the hub, and blade slots may or may not have this coating. In addition, the contact points or mating surfaces between these components such as the disk post pressure faces (i.e., the mating surface between the disk post and the turbine blade dovetail), as well as the contact points between the disks and seals, can be void or absent of the corrosion resistant coating so as to retain desired or specified as produced dimensions.

As used herein, the term "CTE" refers to the coefficient of thermal expansion of a material, and is referred to herein in units of $10^{-6}/°$ F. For example, alumina which has a coefficient of thermal expansion of about 4 to $5\times10^{-6}/°$ F. at about 1200° F. (649° C.) is referred to herein as having a CTE of about 4 to 5.

As used herein, the term "CTE greater than alumina" refers to a CTE of the non-alumina particulate that is measurably greater than that of the CTE of the alumina particulate at the same or similar reference temperature. Typically the CTE of the non-alumina particulate is at least about 0.2 greater, more typically, at least about 0.5 greater than that of the CTE of the alumina particulate.

As used herein, the term "comprising" means various particulates, materials, coatings, compositions, components, layers, steps, etc., can be conjointly employed in the present invention. Accordingly, the term "comprising" encompasses the more restrictive terms "consisting essentially " of and "consisting of".

All amounts, parts, ratios and percentages used herein are by weight unless otherwise specified.

Aqueous coating compositions comprising alumina particulates and phosphate-containing binder systems, with or without additional chromate binders or other binder materials, can be used to provide corrosion resistant coatings for turbine seals and other turbine components such as turbine disks and shafts. The ability to easily and inexpensively form such corrosion resistant coatings on metal substrates of turbine components such as turbine seals, turbine disks, turbine shafts and turbine blades makes them desirable. For example, these compositions can be delivered by relatively easy and inexpensive techniques, for example, by spraying the aqueous coating composition comprising the alumina particulates and phosphate-containing binder system (with or without other binder materials) on the metal substrate of the component, followed by heating to a curing temperature of, for example, at least about 250° F. (121° C.), more typically at least about 500° F. (260° C.) to provide a corrosion resistant coating comprising alumina particulates adhered to or within a glassy phosphate-containing binder matrix.

However, it has been unfortunately discovered that these corrosion resistant coatings comprising alumina particulates adhered to or within this phosphate-containing binder matrix can fail when subjected to thermal cycling and cyclic mechanical strain at elevated temperatures, e.g. at temperatures of about 1200° F. (649° C.) or greater. In particular, cracks have been found to form at the coating-substrate interface, and then propagate by a shear mechanism through other portions of the coating. Because of this crack formation and propagation, the entire coating or portions thereof (e.g., layers of the coating) can undesirably detach from and spall off from the metal substrate.

This crack formation, propagation and spalling phenomena has been found to be due to the difference in CTE between the alumina particulates in the coating and the metal substrate. At elevated temperatures of interest, e.g., about 1200° F. (649° C.) or greater, the CTE of alumina is about 4 to 5. By contrast, the CTE of the metal substrate at these elevated temperatures has a much higher CTE, e.g., typically about 8. Because of this CTE difference or mismatch, the corrosion resistant coating comprising alumina particulates adhered to or within the phosphate-containing binder matrix is more vulnerable to strain tolerance failure when subjected to thermal cycling and cyclic mechanical strain at these elevated temperatures.

The corrosion resistant coating compositions of this invention solve this strain tolerance failure problem by replacing partially or entirely (i.e., at least about 5% of, typically at least about 25% of, more typically at least about 50% of and potentially 100% of) the alumina particulates in the particulate component of the composition with corrosion resistant non-alumina particulates that have a CTE greater than that of alumina. By replacing the alumina particulates partially or entirely with these corrosion resistant non-alumina particulates having higher CTEs, the resultant corrosion resistant coatings of this invention can provide a better CTE match with the underlying metal substrate. This leads to greater strain tolerance in the corrosion resistant coatings of this invention when subjected to thermal cycling and cyclic mechanical strain at elevated temperatures. In addition, this allows the use of, for example, liquid, e.g., aqueous, corrosion resistant coating compositions comprising phosphate-containing binder systems (with or without chromates and/or other binder materials) to deliver these corrosion resistant non-alumina particulates (with or without alumina particulates) by relatively easy and inexpensive techniques (e.g., spraying) to the metal substrate for subsequent curing to provide at least one layer CTE compatible layer of the corrosion resistant coating adjacent to the substrate.

The various embodiments of articles having the corrosion resistant coating of this invention are further illustrated by reference to the drawings as described hereafter. Referring to FIG. 1, an illustrative turbine component in the form of a turbine engine rotor 30 is provided that can be of any operable type, for example, a turbine disk 32 or a turbine seal element 34. FIG. 1 schematically illustrates a stage 1 turbine disk 36, a stage 1 turbine blade 38 mounted to the turbine disk 36, a stage 2 turbine disk 40, a stage 2 turbine blade 42 mounted to the turbine disk 40, a forward turbine seal 44 that also functions as a forward blade retainer for blade 38, an aft turbine seal 46, and an interstage turbine seal 48 that also functions as a forward blade retainer for blade 42, as well as an aft blade retainer 50 for blade 38 that is held in place by seal 48, and an aft blade retainer 52 for blade 42. Any or all of these turbine disks 32 (e.g., stage 1 turbine disk 36 and a stage 2 turbine disk 40), turbine seal elements 34 (e.g., forward turbine seal 44, an aft turbine seal 46, and an interstage turbine seal 48) and/or blade retainers 50/52, and/or turbine blades 38/42, or any selected portion thereof, can be provided with the corrosion resistant coating of this invention, depending upon whether corrosion is expected or observed.

Figure 2:
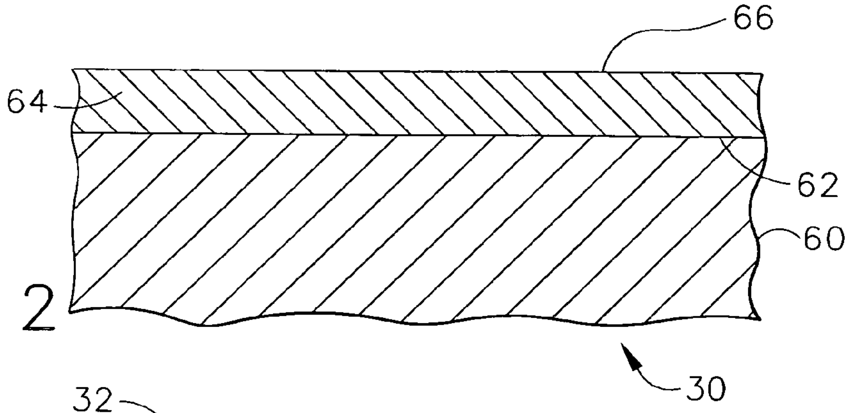
FIG. 2 is a schematic view of a corrosion resistant coating of this invention deposited on the metal substrate of the turbine component.

Referring to FIG. 2, the metal substrate 60 of turbine engine rotor 30 can comprise any of a variety of metals, or more typically metal alloys, including those based on nickel, cobalt and/or iron alloys. Substrate 60 typically comprises a superalloy based on nickel, cobalt and/or iron. Such superalloys are disclosed in various references, such as, for example, commonly assigned U.S. Pat. No. 4,957,567 (Krueger et al), issued Sept. 18, 1990, and U.S. Pat. No. 6,521,175 (Mourer et al), issued Feb. 18, 2003, the relevant portions of which are incorporated by reference. Superalloys are also generally described in Kirk-Othmer's Encyclopedia of Chemical Technology, 3rd Ed., Vol. 12, pp. 417-479 (1980), and Vol. 15, pp. 787-800 (1981). Illustrative nickel-based superalloys are designated by the trade names Inconelg, Nimonic®, Rene® (e.g., Rene® 88, Rene® 104 alloys), and Udimet®.

Substrate 60 more typically comprises a nickel-based alloy, and particularly a nickel-based superalloy, that has more nickel than any other element. The nickel-based superalloy can be strengthened by the precipitation of gamma prime or a related phase. A nickel-based superalloy for which the corrosion resistant coating of this invention is particularly useful is available by the trade name Rene® 88, which has a nominal composition, by weight of 13% cobalt, 16% chromium, 4% molybdenum, 3.7% titanium, 2.1% aluminum, 4% tungsten, 0.70% niobium, 0-015% boron, 0.03% zirconium, and 0.03 percent carbon, with the balance nickel and minor impurities.

Prior to forming the corrosion resistant coating 64 of this invention on the surface 62 of metal substrate 60, surface 62 is typically pretreated mechanically, chemically or both to make the surface more receptive for coating 64. Suitable pretreatment methods include grit blasting, with or without masking of surfaces that are not to be subjected to grit blasting (see U.S. Pat. No. 5,723,078 to Nagaraj et al, issued Mar. 3, 1998, especially col. 4, lines 46-66, which is incorporated by reference), micromachining, laser etching (see U.S. Pat. No. 5,723,078 to Nagaraj et al, issued Mar. 3, 1998, especially col. 4, line 67 to col. 5, line 3 and 14-17, which is incorporated by reference), treatment with chemical etchants such as those containing hydrochloric acid, hydrofluoric acid, nitric acid, ammonium bifluorides and mixtures thereof, (see, for example, U.S. Pat. No. 5,723,078 to Nagaraj et al, issued Mar. 3, 1998, especially col. 5, lines 3-10; U.S. Pat. No. 4,563,239 to Adinolfi et al, issued Jan. 7, 1986, especially col. 2, line 67 to col. 3, line 7; U.S. Pat. No. 4,353,780 to Fishter et al, issued Oct. 12, 1982, especially col. 1, lines 50-58; and U.S. Pat. No. 4,411,730 to Fishter et al, issued Oct. 25, 1983, especially col. 2, lines 40-51, the relevant portions of which are incorporated by reference), treatment with water under pressure (i.e., water jet treatment), with or without loading with abrasive particles, as well as various combinations of these methods. Typically, the surface 62 of metal substrate 60 is pretreated by grit blasting where surface 62 is subjected to the abrasive action of silicon carbide particles, steel particles, alumina particles or other types of abrasive particles. These particles used in grit blasting are typically alumina particles and typically have a particle size of from about 600 to about 35 mesh (from about 25 to about 500 micrometers), more typically from about 360 to about 300 mesh (from about 35 to about 50 micrometers).

The corrosion resistant coating 64 can be formed on metal substrate 60 by any method comprising the steps of: (a) depositing at least one layer of the corrosion resistant coating composition on metal substrate 60; and (b) curing the deposited coating composition at a temperature that causes the corrosion resistant particulate component (i.e., non-alumina particulates, plus any alumina particulates) and glass-forming binder component to form at least one layer of the corrosion resistant coating 64 adjacent to metal substrate 60 that comprises an amorphous, glassy matrix of binder to which the particulates in the particulate component are embedded in, encapsulated in, enclosed by, or otherwise adhered to. The corrosion resistant coating composition can be deposited in solid form, e.g., as a flowable solid, as a cast tape (e.g., a cast tape formed as a layer or plurality layers of particulates adhered together as a coherent mass or matrix by the binder, with or without a supporting structure such as a film, strip, etc.), etc, to provide a solid uncured layer of the composition comprising the particulates and binder component. More typically, the coating composition is deposited as a liquid, e.g., an aqueous coating composition. Liquid corrosion resistant coating compositions of this invention can be deposited on substrate 60 by any manner of application for depositing liquids including pouring, flowing, dipping, spraying, rolling, etc., to provide an uncured layer of the composition comprising the particulates and binder component. This deposited solid or liquid uncured composition layer is then cured, typically by heating to a temperature of at least about 250° F. (121° C.), more typically at least about 500° F. (260° C.) to form corrosion resistant coating 64. Coating 64 can be formed up to a thickness of about 10 mils (254 microns), and typically has thickness in the range of from about 0.1 to about 5 mils (from about 3 to about 127 microns), more typically from about 0.2 to about 4 mils (from about 5 to about 102 microns).

Figure 3:
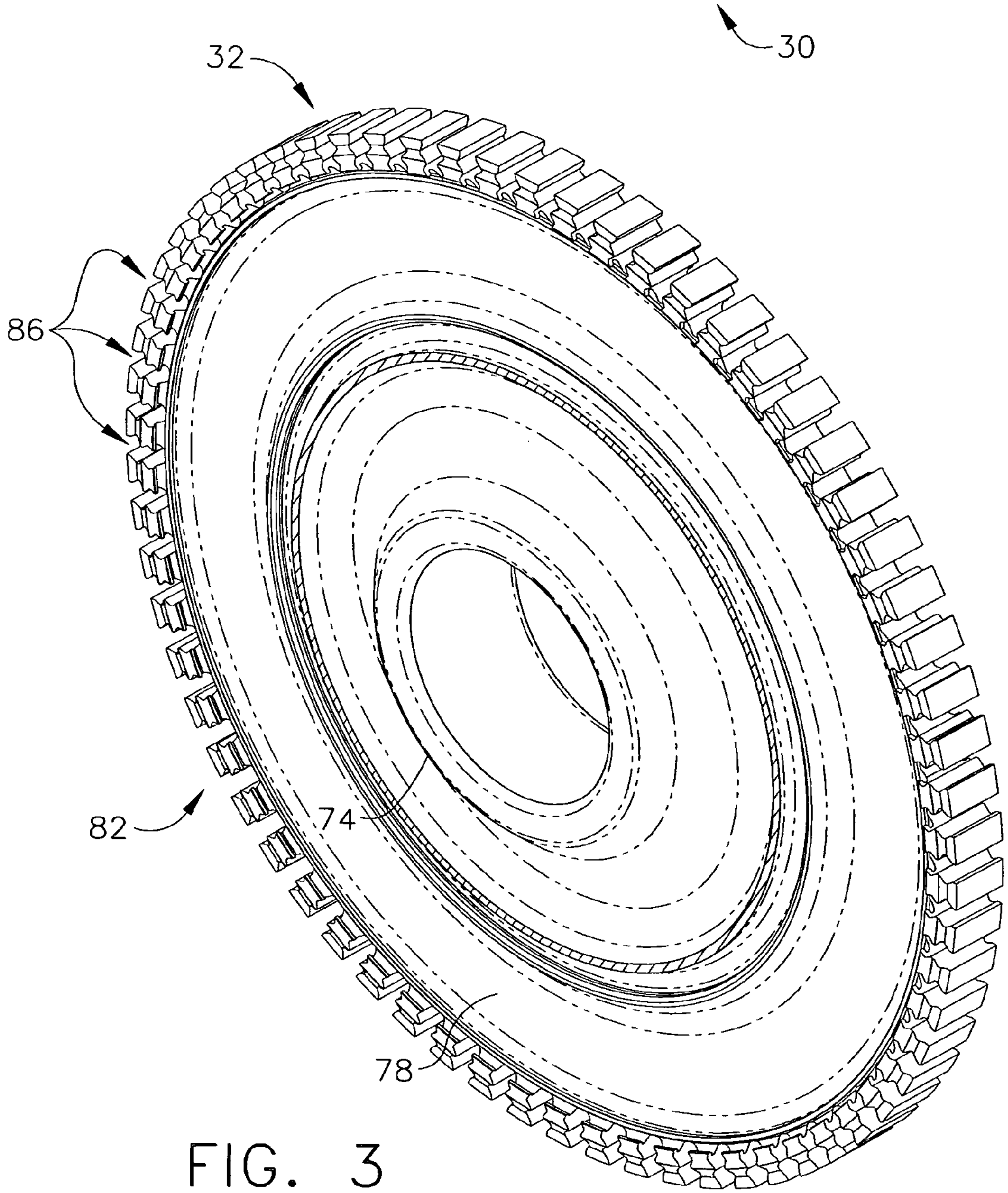
FIG. 3 is a frontal view of a turbine disk showing where the corrosion resistant coating of this invention can be desirably located.

As illustrated in FIG. 3, typically only a portion of the surface of these turbine disks/shafts, seals and/or blade retainers are provided with the corrosion resistant coating 64 of this invention. FIG. 3 shows a turbine disk 32 having an inner generally circular hub portion indicated as 74 and an outer generally circular perimeter or diameter indicated as 78, and a periphery indicated as 82 that is provided with a plurality of circumferentially spaced slots indicated as 86 for receiving the root portion of turbine blades such as 38, 42. While the corrosion resistant coating 64 can be applied to the entire surface of disk 70, it is typically needed only on the surface of outer diameter 78.

Coating 64 can be formed as a single layer, or can be formed as a plurality of layers. In forming a plurality of layers in coating 64, each respective layer can be formed by depositing a coating composition and then curing the deposited composition, with the layers being built up by depositing new portions of a coating composition on the underlying layer that was previously formed. A least the layer adjacent to metal substrate 60 is formed from the corrosion resistant coating composition of this invention, with the other layers being formed from the corrosion resistant coating composition of this invention or from other coating compositions. The respective layers of coating 64 can have the same or differing thicknesses. For example, when coating 64 comprises a plurality of layers, these layers typically tend to decrease in thickness in the direction from the inner layers (i.e., those closer to substrate 60) to the outer layers (i.e., those layers further away from substrate 60). The coating composition used in forming each of the respective layers can have the same or differing levels of particulate component and glass-forming binder component, as well as the same or differing types of particulates in the particulate component.

The coating composition used in forming each of the respective layers can also have the same or a differing binder component, for example, magnesium phosphate in the inner layers and aluminum phosphate in the outer layers. In addition, the level of alumina particulates in the particulate component of the coating composition can differ in the respective layers, and typically increases from the inner layers to the outer layers. For example, the inner layer or layers adjacent to the metal substrate can be formed from the corrosion resistant coating compositions of this invention comprising a level or amount of non-alumina particulates (e.g., at least about 5%, typically at least about 25%, more typically at least about 50% and potentially 100%) having a better CTE match with the metal substrate, while the outer layer or layers not adjacent to the metal substrate can comprise a level or amount of alumina particulates (e.g., up to and including 100% alumina particulates) so as not to be measurably different from the CTE of alumina.

Each layer of coating 64 deposited can be cured to the same or different degrees. If desired, an outer glassy sealant layer can be formed for coating 64 by depositing and curing a composition that is similar to or consists essentially of a glass-forming binder component that is substantially free of the particulate component, e.g., a sealant composition. Such outer glassy sealant layers can be formed from commercially available sealant products, for example, Alseal 598 (from Coatings for Industry, Inc.), SermaSeal TCS (from Sermatech International), etc.

Figure 4:
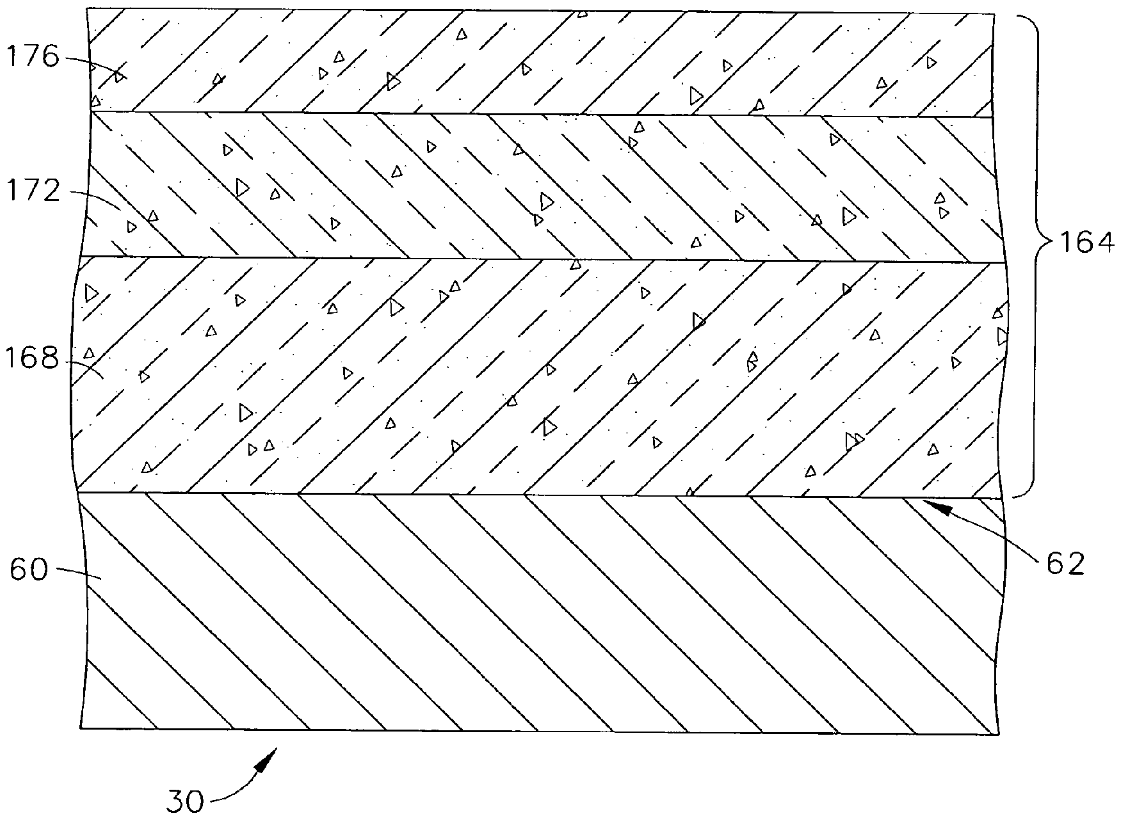
FIG. 4 is a schematic view similar to FIG. 2 of a corrosion resistant coating of this invention comprising a plurality of layers.

An embodiment of a corrosion resistant coating of this invention comprising a plurality of layers is shown in FIG. 4 and is indicated generally as 164. As shown in FIG. 4, coating 164 comprises an inner layer 168 that is adjacent to and overlaying metal substrate 60, and is formed from a corrosion resistant coating composition of this invention. Inner layer 168 is relatively thick and typically has a thickness of from about 0.1 to about 5 mils (from about 3 to about 127 microns), more typically from about 0.2 to about 4 mils (from about 5 to about 102 microns). The particulate component comprising inner layer 168 also typically has a greater level or amount of non-alumina particulates, relative to the amount or level of alumina particulates, to provide a better CTE match with substrate 60. The particulate component in inner layer 168 comprises from 0 to about 95% alumina particulates and from about 5 to 100% non-alumina particulates, typically from 0 to about 75% alumina particulates and from about 25 to 100% non-alumina particulates, more typically from 0 to about 50% alumina particulates and from about 50 to 100% non-alumina particulates, and can potentially consist essentially of, or entirely of (i.e., is 100%), non-alumina particulates.

Coating 164 also comprises an intermediate layer indicated generally as 172 adjacent to and overlaying inner layer 168. Intermediate layer 172 is typically relatively thinner, especially relative to inner layer 168. Intermediate layer 172 typically has thickness of from about 0.01 to about 5 mils (from about 0.3 to about 127 microns), more typically from about 0.1 to about 3 mils (from about 3 to about 76 microns). The particulate component of intermediate layer 172 can also comprise an increased amount or level of alumina particulates than that present in inner layer 168 because there is less of a need for a CTE match with inner layer 168. For example, intermediate layer 172 can potentially have a CTE that is not measurably different from that of alumina. Typically, the particulate component in intermediate layer 172 can comprise from 0 to about 100% alumina particulates and from 0 to 100% non-alumina particulates, and can potentially consist essentially of, or entirely of (i.e., is 100%), alumina particulates.

As shown in FIG. 4, coating 164 can further comprise an outer layer indicated generally as 176 adjacent to and overlaying intermediate layer 172. (In the absence of layer 176, layer 172 would become the outer layer of coating 164, i.e., overlaying and directly adjacent to inner layer 168.) This outer layer 176 can comprise a particulate component, but is typically substantially free of particulates. Typically, outer layer 176 is formed from a sealant composition or a composition that consists essentially of, or entirely of, a glass-forming binder component (i.e., is substantially free of particulates) to form a glassy outer sealant layer. Outer layer 176 is also typically the thinnest layer of coating 164, especially when substantially free of particulates. Typically, outer layer 176 has a thickness of from about 0.01 to about 2 mils (from about 0.3 to about 51 microns), more typically from about 0.1 to about 1 mils (from about 3 to about 25 microns).

While the above embodiments have been described in the context of coating turbine engine disks, this invention can be used to form corrosion resistant coatings, as described above, on the surfaces of various other turbine engine rotor components, including turbine shafts and seals, exposed to oxygen and other corrosive elements at elevated temperatures, turbine components comprising airfoils, for example turbine blades and vanes, etc. The corrosion resistant coatings of this invention can also be applied during original manufacture of the component (i.e., an OEM component), after the component has been in operation for a period of time, after other coatings have been removed from the component (e.g., a repair situation), while the component is assembled or after the component is disassembled, etc.

Figure 5:
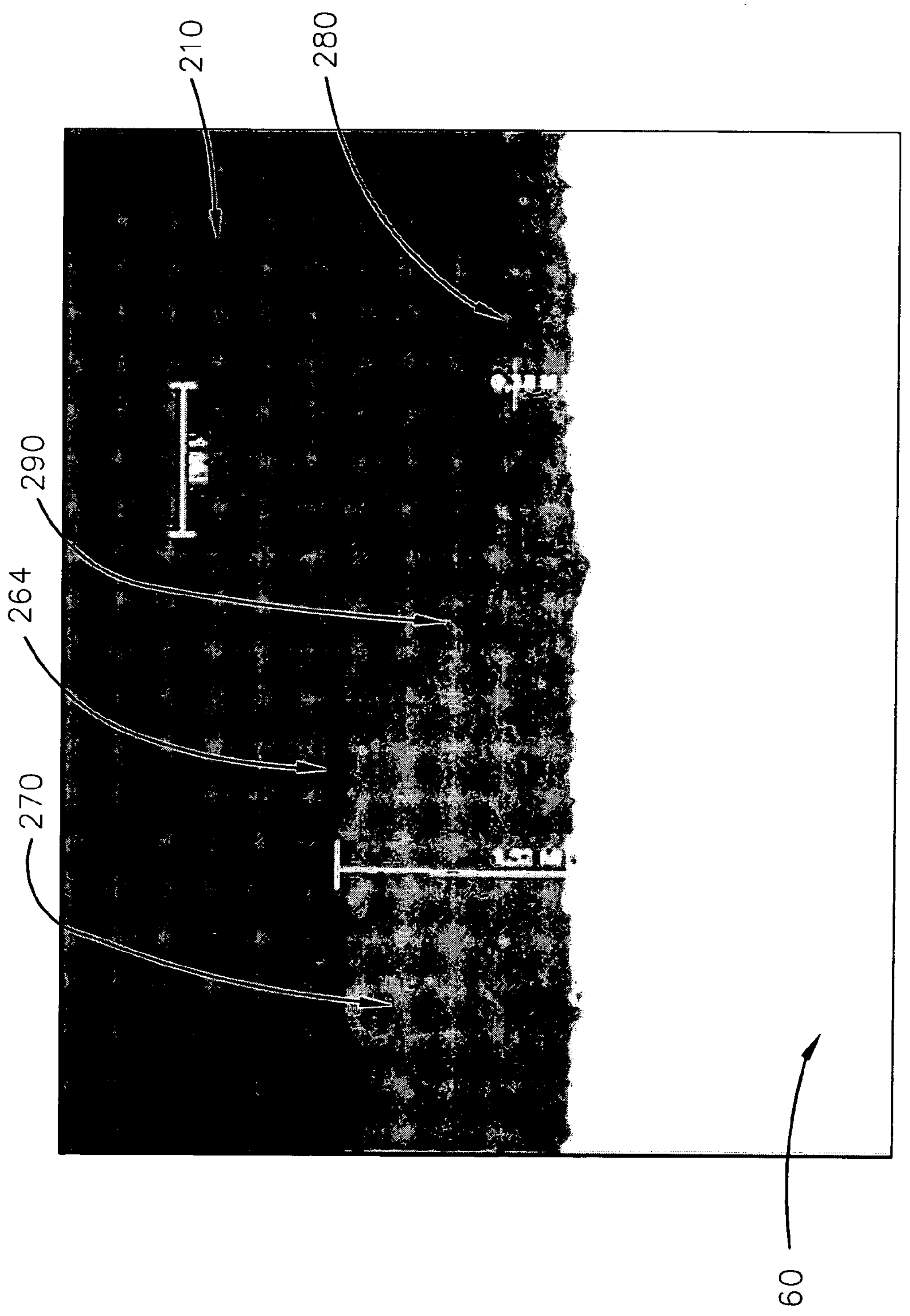
FIG. 5 is an image of a sample showing the cross-section of a metal substrate and overlaying corrosion resistant coating after furnace thermal cycle testing, wherein the coating includes an inner layer comprising solely alumina particulates in a phosphate binder, an intermediate layer comprising solely chromia particulates in a phosphate binder and an outer glassy sealant layer.
Figure 6:
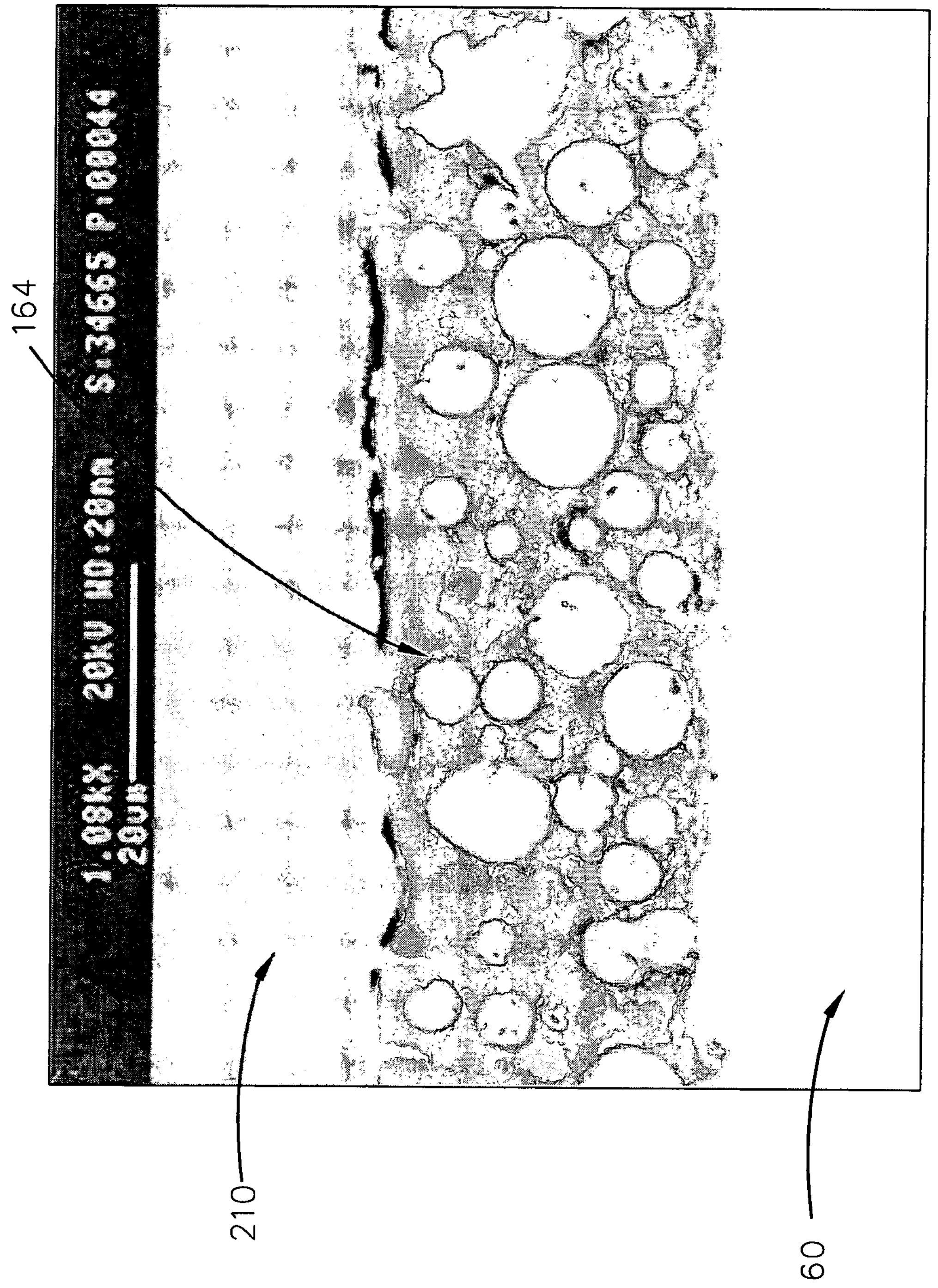
FIG. 6 is an image of another sample showing the cross-section of a metal substrate and overlaying corrosion resistant coating of this invention after furnace thermal cycle testing, wherein the coating includes an inner layer comprising solely CoNiCrAlY particulates in a phosphate binder and an outer glassy sealant layer.

To illustrate the benefits of the corrosion resistant coatings of this invention, samples comprising different corrosion resistant coatings, and especially different particulate component compositions, are subjected to furnace thermal cycle testing to assess coating spallation resistance. Cross-sectional images of these samples are shown in FIGS. 5 and 6. Each of the samples shown in FIGS. 5 and 6 have been mounted in an epoxy metallographic media indicated as 210.

The sample of FIG. 5 shows the cross-section of a corrosion resistant coating 264 having an initial thickness of about 1.5 mils (39 microns) and overlaying a metal substrate 60 comprising a Rene® 88 nickel alloy. Coating 264 initially has three layers: (1) an inner layer comprising solely alumina particulates in a phosphate binder overlaying and adjacent to substrate 60; (2) an intermediate layer comprising solely chromia particulates in a phosphate binder overlaying and adjacent to the inner layer; and (3) an outer sealant layer comprising phosphate binder material only overlaying and adjacent to the intermediate layer.

The sample of FIG. 6 shows the cross-section of a corrosion resistant coating 164 of this invention having an initial thickness of about 1.2 mils (30 microns) and overlaying a metal substrate 60 comprising a Rene® 88 nickel alloy. Coating 164 has two layers: (1) an inner layer comprising solely CoNiCrAlY particulates in a phosphate binder formed from a corrosion resistant coating composition of this invention overlaying and adjacent to substrate 60; and (2) an outer sealant layer comprising solely phosphate binder material overlaying and adjacent to the inner layer.

The samples of FIGS. 5 and 6 are each subjected to rapid thermal cycling testing to determine the resistance of the respective corrosion resistant coatings to spallation resistance.

This cycle testing consisted of 300 thermal cycles, each thermal cycle having the following schedule or pattern: heating at a rate of ~200° F. (111° C.)/min from about 500° F. (260° C.) up to 1400° F. (760° C.), holding at 1400°F. (760° C.) for 45 minutes, and then cooling from 1400° F. (760° C.) down to less than 500° F. (260° C.) at a rate of 200° F. (111° C.)/min.

As shown in FIG. 5, the corrosion resistant coating 264 comprising the alumina/chromia particulates exhibited significant spallation. See arrow 270 indicating the unspalled portion of coating 264, arrow 280 indicating the spalled portion of coating 264, and arrow 290 indicating the interface between the unspalled and spalled portions of coating 264. By contrast, and as shown in FIG. 6, the corrosion resistant coating 164 of this invention comprising the layer having solely CoNiCrAlY particulates adjacent to substrate 60 is essentially intact, with minimal or no spallation.

While specific embodiments of this invention have been described, it will be apparent to those skilled in the art that various modifications thereto can be made without departing from the spirit and scope of this invention as defined in the appended claims.

What is claimed is:

1. A composition comprising:

a particulate corrosion resistant component consisting essentially of:

from 0 to about 95% alumina particulates; and from about 5 to about 100% corrosion resistant non-alumina particulates having a CTE greater that of the alumina particulates, wherein the non-alumina particulates comprise an overlay metal alloy having the formula MCrAlY, wherein M is a nickel or nickel-cobalt alloy, and wherein the corrosion resistant non-aluminum particulates further comprise yttria-stabilized zirconia; and a glass-forming phosphate-containing binder component.

2. The composition of claim 1 wherein the particulate corrosion resistant component comprises from 0 to about 50% alumina particulates; and from about 50 to a 100 non-alumina corrosion resistant particulates.

3. The composition of claim 1 wherein the phosphate-containing binder component comprises one or more of an aluminum phosphate, a magnesium phosphate, or a chromium phosphate.

4. The composition of claim 1 wherein the phosphate-containing binder component is substantially chromate free.

5. The composition of claim 4 which further comprises a liquid carrier component.

6. The composition of claim 5 wherein the liquid carrier component comprises water.

7. The composition of claim 1 wherein the particulate corrosion resistant component comprises from 0 to about 75% alumina particulates and from about 25 to 100% corrosion resistant non-alumina particulates.

8. An article comprising:

a turbine component comprising a metal substrate; and a corrosion resistant coating having thickness up to about 10 mils overlaying the metal substrate, wherein at least the layer of the corrosion resistant coating adjacent to the metal substrate comprises:

a glass-forming phosphate-containing binder component; and a particulate corrosion resistant component adhered to the glass-forming binder component and comprising:

from 0 to about 95% alumina particulates; and from about 5 to 100% corrosion resistant non-alumina particulates having a CTE greater than that of the alumina particulates, wherein the non-alumina particulates comprise an overlay metal alloy having the formula MCrAlY, wherein M is a nickel or nickel-cobalt alloy, and wherein the corrosion resistant non-aluminum particulates further comprise yttria-stabilized zirconia.

9. The article of claim 8 wherein the turbine component is a turbine disk, a turbine shaft, or a turbine seal.

10. The article of claim 8 wherein the turbine component is a turbine blade or turbine vane.

11. The article of claim 8 wherein the corrosion resistant coating comprises a single layer.

12. The article of claim 8 wherein the corrosion resistant coating has a thickness of from about 0.1 to about 5 mils.

13. The article of claim 8 wherein the corrosion resistant coating comprises a plurality of layers, and wherein the layer adjacent to the metal substrate is an inner layer and wherein the layer overlaying and adjacent to the inner layer comprises a particulate component having a percent weight level of alumina particulates greater that of the particulate component of the inner layer or is a glassy outer sealant layer that is substantially free of particulates.

14. The article of claim 13 wherein the inner layer has a thickness of from about 0.3 to about 5 mils and wherein the layer overlaying the inner layer has a thickness of from about 0.1 to about 5 mils.

15. The article of claim 8 wherein the particulate corrosion resistant component comprises from 0 to about 50% alumina particulates and from about 50 to 100% corrosion resistant non-alumina particulates.

16. The article of claim 15 wherein the particulate component consists essentially of corrosion resistant non-alumina particulates.

17. The article of claim 8 wherein the at least one layer of the corrosion resistant coating is on a selected portion of the metal substrate.

18. An article comprising a corrosion resistant coating having at least a layer comprising:

a glass-forming phosphate-containing binder component; and a particulate corrosion resistant component adhered to the glass-forming binder component and comprising:

from 0 to about 95% alumina p articulates; and from about 5 to 100% corrosion resistant non-alumina particulates having a CTE greater than that of the alumina particulates, wherein the non-alumina particulates comprise an overlay metal alloy having the formula MCrAlY, wherein M is a nickel or nickel-cobalt alloy, and wherein the corrosion resistant non-aluminum particulates further comprise yttria-stabilized zirconia.

19. The article of claim 18 wherein the corrosion resistant coating comprises a single layer.

20. The article of claim 18 wherein the corrosion resistant coating has a thickness up to about 10 mils.

21. The article of claim 18 wherein the corrosion resistant coating has a thickness of from about 0.1 to about 5 mils.

22. The article of claim 18 wherein the corrosion resistant coating comprises a plurality of layers, including an inner layer and wherein the layer overlaying and adjacent to the inner layer comprises a particulate component having a percent weight level of alumina particulates greater than that of the particulate component of the inner layer or is a glassy outer sealant layer that is substantially free of p articulates.

23. The article of claim 22 wherein the inner layer has a thickness of from about 0.3 to about 5 mils and wherein the layer overlaying the inner layer has a thickness of from about 0.1 to about 5 mils.

24. The article of claim 18 wherein the particulate corrosion resistant component comprises from 0 to about 50% alumina particulates and from about 50 to 100% corrosion resistant non-alumina particulates.

25. The article of claim 18 wherein the particulate component consists essentially of corrosion resistant non-alumina particulates.

* * * * *